United States Patent
Smith

(12) 
(10) Patent No.: US 6,169,541 B1
(45) Date of Patent: Jan. 2, 2001

(54) METHOD, APPARATUS AND SYSTEM FOR INTEGRATING TELEVISION SIGNALS WITH INTERNET ACCESS

(75) Inventor: Richard Michael Smith, Rochester, MN (US)

(73) Assignee: International Business Machines Corporation, Armonk, NY (US)

(*) Notice: Under 35 U.S.C. 154(b), the term of this patent shall be extended for 0 days.

(21) Appl. No.: 09/086,787

(22) Filed: May 28, 1998

(51) Int. Cl.[7] .................................................. H04N 7/173
(52) U.S. Cl. .............................. 345/327; 348/10; 348/564
(58) Field of Search ............................... 345/327; 348/10, 348/906, 12, 13, 7, 460, 461, 464, 468, 467, 473, 553, 563, 564, 569; 455/4.2, 5.1, 6.1, 6.2; 709/219; H04N 7/173, 7/16

(56) References Cited

U.S. PATENT DOCUMENTS

| | | |
|---|---|---|
| 5,262,860 | 11/1993 | Fitzpatrick et al. . |
| 5,481,296 | 1/1996 | Cragun et al. . |
| 5,481,542 | 1/1996 | Logston et al. . |
| 5,488,412 | 1/1996 | Majeti et al. . |
| 5,570,295 | 10/1996 | Isenberg et al. . |
| 5,649,284 | 7/1997 | Yoshinobu . |
| 5,694,163 | 12/1997 | Harrison . |
| 5,761,606 * | 6/1998 | Wolzien ................................. 348/10 |
| 5,774,664 * | 6/1998 | Hidary et al. ................... 395/200.48 |
| 5,774,666 * | 6/1998 | Portuesi ........................... 395/200.48 |
| 5,818,935 * | 10/1998 | Maa ...................................... 348/467 |
| 5,832,223 * | 11/1998 | Hara et al. ............................ 348/449 |
| 5,929,849 * | 7/1999 | Kikinis ................................. 345/327 |
| 6,018,768 * | 1/2000 | Ullman et al. ......................... 348/12 |
| 6,025,837 * | 2/2000 | Matthews, III et al. ............. 345/327 |

FOREIGN PATENT DOCUMENTS

| | | |
|---|---|---|
| 9-162818 | 6/1997 | (JP) . |
| WO 97/41690 | 11/1997 | (WO) . |

OTHER PUBLICATIONS

Patent Application No.: AT9–97–332, J.L. Taylor, "Method and System for Scanning and Recording a Uniform Resource Locator (URL) from a Broadcast Signal and use Thereof to Control a Web Browser".

* cited by examiner

*Primary Examiner*—Chris Grant
(74) *Attorney, Agent, or Firm*—Joan Pennington

(57) ABSTRACT

A method, computer program product and system are provided for integrating television signals with internet access. A television signal is received and divided into images and universal resource locators (URLs). Checking is performed to identify a filtered image user selection. Responsive to a filtered image user selection not being identified, the image is altered to visually emphasize URLs. Then the visually altered image is rendered for display. Responsive to a filtered image user selection being identified, the filtered image without URLs is rendered for display. The user enters user selected preferences and used selected filtering for display.

17 Claims, 4 Drawing Sheets

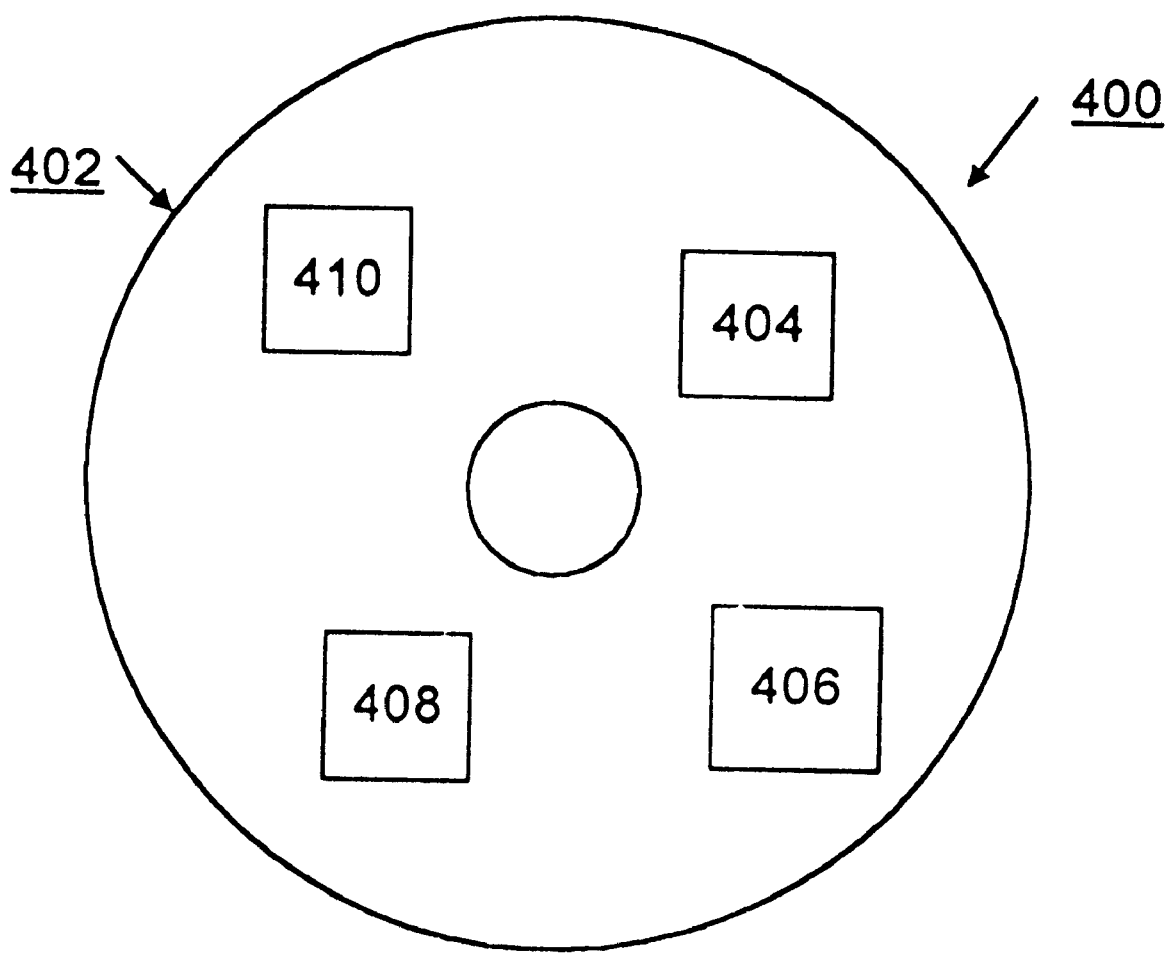

METHOD, APPARATUS AND SYSTEM FOR INTEGRATING TELEVISION SIGNALS WITH INTERNET ACCESS

FIELD OF THE INVENTION

The present invention relates generally to the data processing field, and more particularly, relates to a method, computer program product and system for integrating television signals with internet access.

DESCRIPTION OF THE PRIOR ART

Today, the internet and the world wide web (WWW) and a TV have been brought together using products such as WebTV. A special remote control and an optional keyboard are provided to access web content through the TV.

Today, it is possible to embed internet access controls into a TV signal; however, there are no mechanisms for specifying user preferences, such as language, in the use of these controls.

A need exists for a mechanism enabling a user to use such embedded internet access controls including an efficient and effective mechanism for specifying user preferences. It should be understood that as used in the following description and claims, a picture displayed on a TV screen is made up of several discrete images.

SUMMARY OF THE INVENTION

A principal object of the present invention is to provide an improved method, computer program product and system for integrating television signals with internet access. Other important objects of the present invention are to provide such method, computer program product and system for integrating television signals with internet access substantially without negative effects and that overcome some disadvantages of prior art arrangements.

In brief, a method, computer program product and system are provided for integrating television signals with internet access. A television signal is received and divided into images and universal resource locators (URLs). Checking is performed to identify a filtered image user selection. Responsive to a filtered image user selection not being identified, the image is altered to visually emphasize URLs. Then the visually altered image is rendered for display. Responsive to a filtered image user selection being identified, the filtered image without URLs is rendered for display.

In accordance with features of the invention, the user enters user selected preferences and user selected filtering for display.

BRIEF DESCRIPTION OF THE DRAWING

The present invention together with the above and other objects and advantages may best be understood from the following detailed description of the preferred embodiments of the invention illustrated in the drawings, wherein:

FIG. 4 is a block diagram illustrating a computer program product in accordance with the preferred embodiment.

DETAILED DESCRIPTION OF THE PREFERRED EMBODIMENTS

Figure 1:
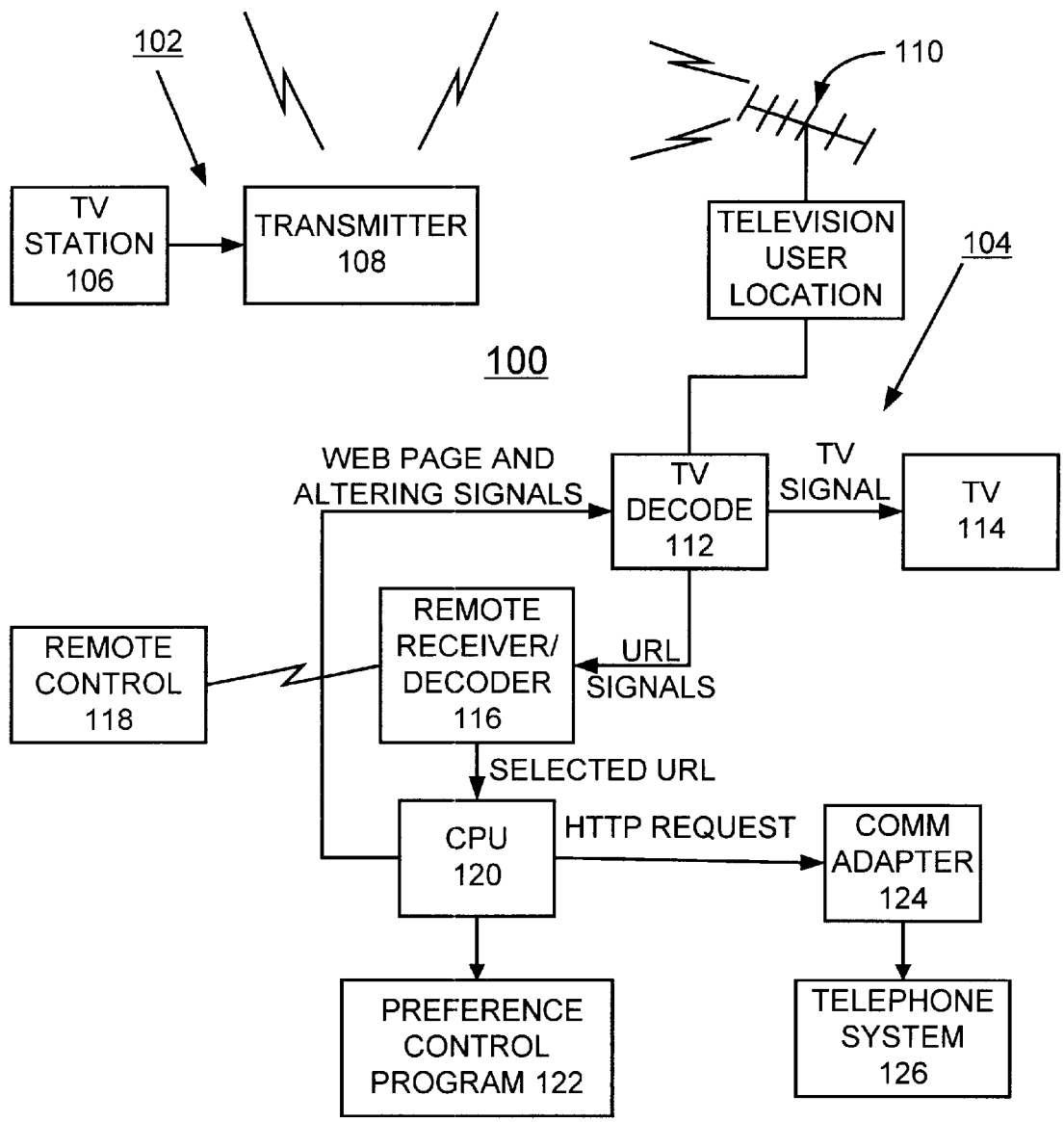
FIG. 1 is a block diagram representation illustrating a system for implementing methods for integrating television signals with internet access in accordance with the invention.

Having reference now to the drawings, in FIG. 1 is a block diagram representation illustrating a system of the preferred embodiment generally designated by the reference character 100. System 100 implements methods for integrating television signals with internet access of the preferred embodiment.

As shown in FIG. 1, system 100 includes a television broadcasting source 102 and a home receiver 104. The television broadcasting source 102 includes a TV station 106 and an associated broadcast antenna or transmitter 108. It should be understood that the methods for integrating television signals with internet access of the preferred embodiment can be used with other sources of television signals, such as digital versatile disk (DVD), prerecorded tapes and other methods of transmitting TV signals, such as satellite.

Home receiver 104 includes a reception antenna 110 or equivalent for receiving a broadcast television signal. A TV decode 112 receives the broadcast television signal and couples a television signal to the TV 114 and universal resource locator (URL) signals to a remote receiver/decoder 116. A remote control 118 is operated by a user for entering selections in accordance with feature of the preferred embodiment. A central processing unit (CPU) 120 is operatively controlled by a preference control program 122 of the preferred embodiment. A communications adapter 124 used in conjunction with the CPU 120 allows the user to access a selected URL using a telephone system 126. Various other arrangements for internet access, such as cable, modems, satellite, and digital subscriber line (DSL) can be used with the methods for integrating television signals with internet access of the preferred embodiment.

Embedded WWW URLs in the received broadcast television signal are arranged similarly to conventional Closed-Captioning information. At any time, the user or viewer specifies their preferences with the remote control 118. When a viewer then selects an image with one or more associated URLs, the user selection preferences are used to select which URL is displayed. A viewer can also specify that an image no longer be visually enhanced. The remote receiver/decoder 116 applies the selected URL to the CPU 120. CPU 120 operatively controls connection to the selected internet URL via the communications adapter 124 and telephone system 126, to download a WEB page for the selected URL and to display the web page on the TV 114 via the TV decode 112.

In accordance with features of the preferred embodiment, embedded WWW URLs in the received broadcast television signal are accessed using the remote control 118. The web page displayed is the URL that matches user selected preferences. Central processor unit 120 is suitably programmed to execute the flowcharts of FIGS. 2–3, to display television images and URLs and web pages, and to interpret user entries in accordance with the preferred embodiment. Control program 122 provides the suitable programming for the central processor unit 120 to perform the methods of the preferred embodiment.

Figure 2:
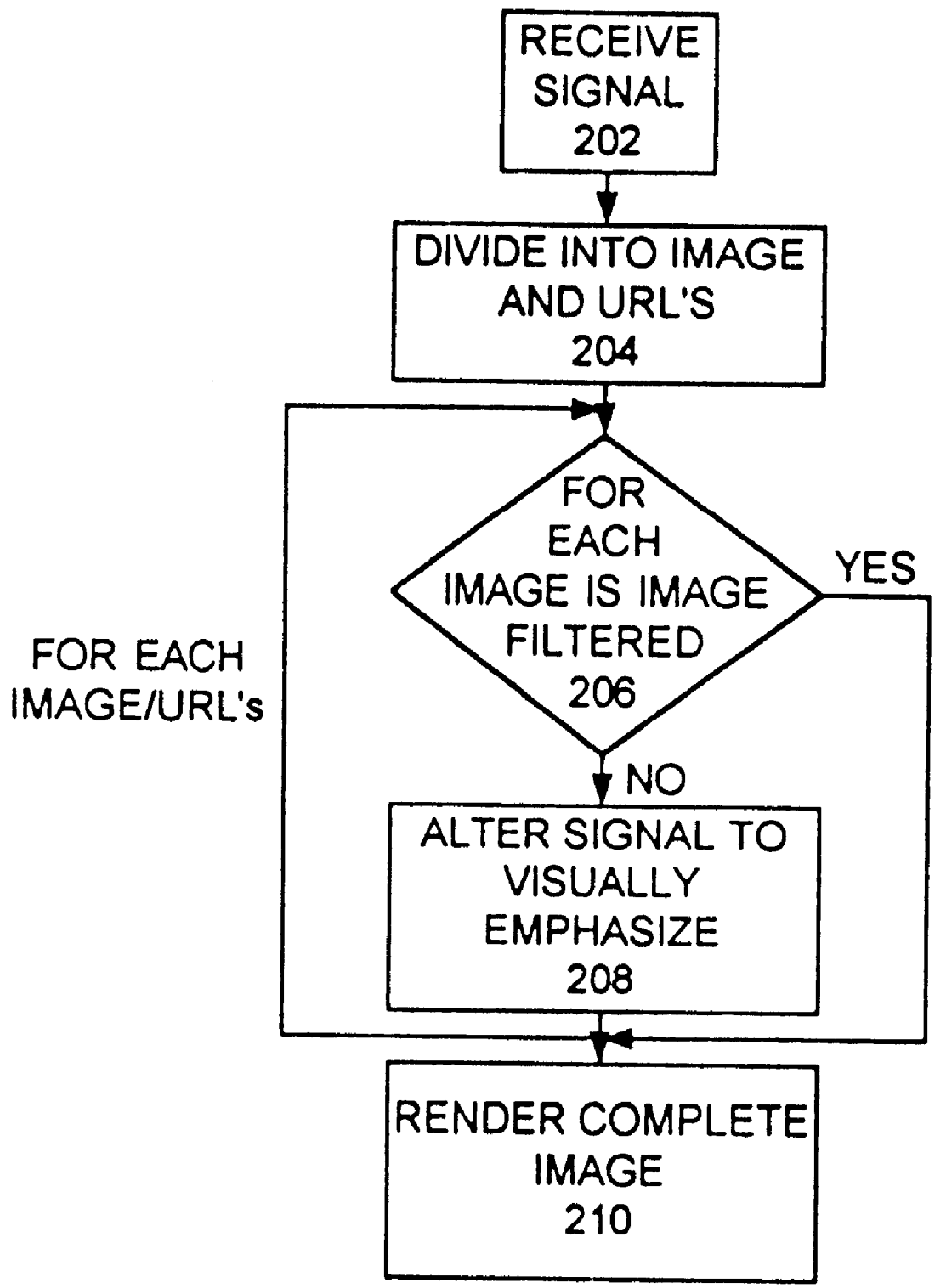
FIGS. 2 and 3 are flow charts illustrating sequential steps for integrating television signals with internet access of the preferred embodiment.
Figure 3:
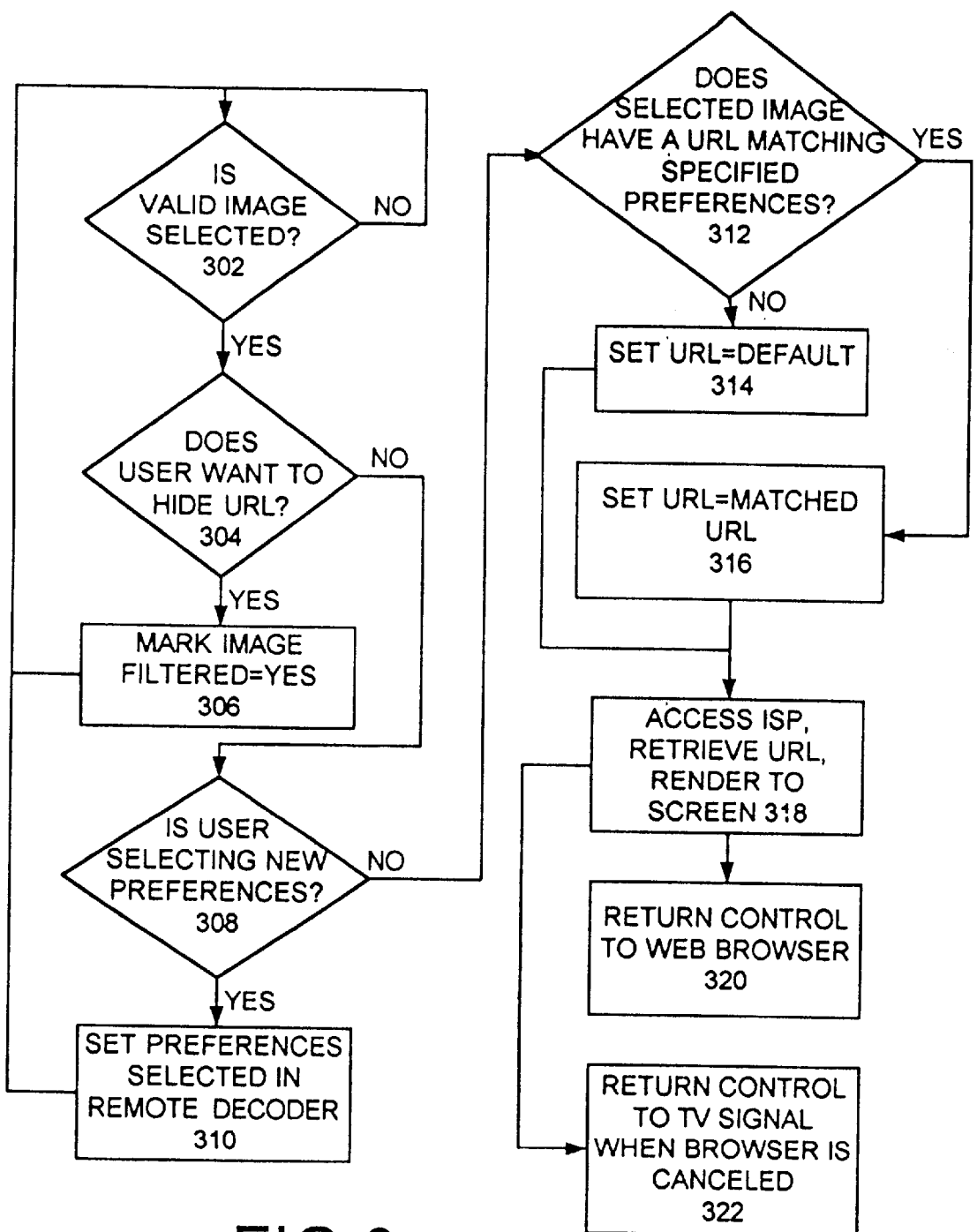

Referring to FIGS. 2 and 3, there are shown exemplary sequential steps for integrating television signals with internet access of the preferred embodiment. In FIG. 2, a signal is received as indicated at a block 202. The received signal is divided into images and URLs as indicated at a block 204. For each image/URL's, checking whether the image is filtered is performed as indicated at a decision block 206. If the image is not filtered, the signal is altered to visually emphasize a portion of the image associated with the URL in accordance with the user preferences as indicated at a block 208. When the image is filtered or after the signal is altered at block 208, then the complete image is rendered for display as indicated at a block 210.

In FIG. 3, the sequential steps begin with checking for a valid image selected as indicated at a decision block 302. When a valid image is selected, checking whether a user wants to hide URLs is performed as indicated at a decision block 304. If the user has selected to hide URLs, the image is marked as filtered=yes as indicated at a block 306. Otherwise if the user has not selected to hide URLs, checking if the user is selecting a new language or other preferences, such as image size or other cultural preferences is performed as indicated at a decision block 308. If the user is selecting a new language, the selected preferences are set in the remote decoder 116 as indicated at a block 310 and the sequential steps are continued returning to block 302. Otherwise if the user is not selecting new preferences, checking whether the selected image has a URL matching the specified preferences is performed as indicated at a decision block 312. When the selected image does not have the specified preferences, then the URL is set to a default as indicated at a block 314. When the selected image does have the specified preferences, then the URL is set to the specific URL as indicated at a block 316. Then the internet service provider (ISP) is ACCESSED, the URL is retrieved and rendered to the television screen as indicated at a block 318. Control is returned to the web browser as indicated at a block 320. Control is returned to the TV signal when the browser is cancelled as indicated at a block 322.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods of the preferred embodiment in the system 100 of FIG. 1.

A sequence of program instructions or a logical assembly of one or more interrelated modules defined by the recorded program means 404, 406, 408, 410, direct the system 100 for implementing methods for integrating television signals with internet access of the preferred embodiment.

While the present invention has been described with reference to the details of the embodiments of the invention shown in the drawing, these details are not intended to limit the scope of the invention as claimed in the appended claims.

What is claimed is:

1. A method for integrating television signals with internet access comprising the steps of:
   receiving a television signal;
   dividing the received television signal into television signal images and universal resource locators (URLs);
   checking for a filtered image user selection,
   responsive to a filtered image user selection not being identified, altering the television signal image to visually emphasize URLs and rendering said visually altered television signal image for display.

2. A method for integrating television signals with internet access as recited in claim 1 further includes the steps of responsive to a filtered image user selection being identified, rendering said filtered television signal image without URL's for display.

3. A method for integrating television signals with internet access as recited in claim 1 further includes the steps of interpreting remote control user entries.

4. A method for integrating television signals with internet access as recited in claim 3 wherein the steps of interpreting remote control user entries includes the steps of checking for a valid image selected, and responsive to a valid image being selected, checking for a user selection to hide URLs.

5. A method for integrating television signals with internet access as recited in claim 4 further includes the steps of responsive to an identified user selection to hide URLs, marking said filtered television signal image user selection to yes.

6. A method for integrating television signals with internet access as recited in claim 3 wherein the steps of interpreting remote control user entries includes the steps of checking for a user selection for preferences, and responsive to an identified new preference user selection, setting said new preference user selection in a remote receiver/decoder.

7. A method for integrating television signals with internet access as recited in claim 6 further includes the steps of setting multiple new preference user selections in said remote receiver/decoder for multiple users.

8. A method for integrating television signals with internet access as recited in claim 3 wherein the steps of interpreting remote control user entries includes the steps of checking for a valid image selected; responsive to a valid image being selected, checking for a URL in the selected image having matching user specified preferences; responsive to no matching user specified preferences in the selected image, setting the URL to a default; and responsive to matching user specified preferences in the selected image, setting the URL to matched URL.

9. A method for integrating television signals with internet access as recited in claim 3 wherein the steps of interpreting remote control user entries includes the steps of identifying a selected URL, accessing an internet service provider, retrieving the selected URL and rendering a web page for display.

10. A method for integrating television signals with internet access as recited in claim 9 further includes the step of returning control to a web browser.

11. A method for integrating television signals with internet access as recited in claim 10 further includes the step of returning control to the television signal when the web browser is canceled.

12. A computer program product for integrating television signals with internet access comprising:
   a recording medium;
   means, recorded on the recording medium, for operative controlling a television signal decoder for dividing a received television signal into television signal image and universal resource locators (URLs);
   means, recorded on the recording medium, for checking for a filtered image user selection,
   means, recorded on the recording medium, responsive to a filtered image user selection not being identified, for altering the television signal image to visually emphasize URLs and for rendering said visually altered television signal image for display.

13. A computer program product for integrating television signals with internet access as recited in claim 12 further includes means, recorded on the recording medium, responsive to a filtered image user selection being identified, for rendering said filtered television signal image without URLs for display.

14. A computer program product for integrating television signals with internet access as recited in claim 12 further includes means, recorded on the recording medium, for identifying a user selection for a new language.

15. A system for integrating television signals with internet access comprising:
- a decoder for receiving a television signal;
- said decoder including means for dividing the received television signal into television signal images and universal resource locators (URLs);
- a remote control for entering user selection preferences and user selection image filtering;
- a remote receiver/decoder for receiving the user entered selections and for checking for a filtered image user selection,
- said remote receiver/decoder being responsive to a filtered image user selection not identified, for altering the television signal image to visually emphasize URLs and for rendering said visually altered image for display.

16. A system for integrating television signals with internet access as recited in claim 15 wherein said remote receiver/decoder being responsive to an identified filtered image user selection, for rendering the filtered television signal image without URLs for display.

17. A system for integrating television signals with internet access as recited in claim 15 wherein said user selection preferences entered by said remote control include a user selected language preference.

* * * * *